US006913636B2

(12) United States Patent
Defrancesco et al.

(10) Patent No.: US 6,913,636 B2
(45) Date of Patent: Jul. 5, 2005

(54) LOW POWER NITROGEN ENRICHED AIR GENERATION SYSTEM

(75) Inventors: Gregory Defrancesco, Simsbury, CT (US); Thomas Zywiak, Suffield, CT (US); Harold W. Hipsky, Willington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 30 days.

(21) Appl. No.: 10/322,015

(22) Filed: Dec. 17, 2002

(65) Prior Publication Data

US 2004/0112220 A1 Jun. 17, 2004

(51) Int. Cl.[7] .......................... B01D 53/04; B01D 53/22
(52) U.S. Cl. .................. 95/8; 95/15; 95/19; 95/39; 95/54; 95/130; 95/138; 96/4; 96/108
(58) Field of Search ........................ 95/8, 14, 15, 17, 95/19, 39, 41, 54, 130, 138; 96/4, 7–9, 108, 130–133, 138

(56) References Cited

U.S. PATENT DOCUMENTS

| 2,944,987 | A | 7/1960 | Potter et al. | |
|---|---|---|---|---|
| 3,628,758 | A | 12/1971 | Nichols | |
| 3,693,915 | A | 9/1972 | Ulanovsky | |
| 3,717,006 | A | 2/1973 | Kimmel et al. | |
| 3,847,298 | A | 11/1974 | Hamilton | |
| 3,948,626 | A | 4/1976 | Bragg | |
| 4,011,734 | A | 3/1977 | Jones | |
| 4,127,011 | A | 11/1978 | Giles et al. | |
| 4,378,920 | A | 4/1983 | Runnels et al. | |
| 4,523,517 | A | 6/1985 | Cronin | |
| 4,527,716 | A | 7/1985 | Haas et al. | |
| 4,545,787 | A | * 10/1985 | Hegarty | 60/783 |
| 4,556,180 | A | 12/1985 | Manatt | |
| 4,560,394 | A | * 12/1985 | McDonald et al. | 95/54 |
| 4,675,030 | A | * 6/1987 | Czarnecki et al. | 95/39 |
| 4,681,602 | A | 7/1987 | Glenn et al. | |
| 4,732,579 | A | * 3/1988 | Veltman et al. | 95/96 |
| 4,749,004 | A | 6/1988 | Peash | |
| 4,793,832 | A | * 12/1988 | Veltman et al. | 95/14 |

(Continued)

FOREIGN PATENT DOCUMENTS

| EP | 0 867 367 | 9/1998 |
|---|---|---|
| EP | 1 283 165 | 2/2003 |
| GB | 1039361 | 3/1965 |

(Continued)

OTHER PUBLICATIONS

European Search Report dated Mar. 15, 2004.
European Search Report dated Jul. 2, 2004.

Primary Examiner—Robert H. Spitzer
(74) Attorney, Agent, or Firm—Carlson, Gaskey & Olds

(57) ABSTRACT

An inerting system provides air with reduced oxygen content by flowing and directing air through an air separation module. Optimal working pressure for the air separation module is obtained with two compressors. A first compressor elevates air from the aircraft cabin to a second pressure. The second pressure is at an intermediate level below the working pressure of the air separation module. A second compressor elevates air from the second pressure to the working pressure. The second compressor is driven by air that is exhausted through a turbine. The pressure difference between air at the working pressure and air required by the fuel distribution system is used to power the turbine and drive the second compressor.

18 Claims, 1 Drawing Sheet

U.S. PATENT DOCUMENTS

| | | | |
|---|---|---|---|
| 4,834,187 A | | 5/1989 | Bragg |
| 4,925,057 A | | 5/1990 | Childress et al. |
| 4,968,219 A | | 11/1990 | Fisher-Votava |
| 5,010,730 A | | 4/1991 | Knuth et al. |
| 5,069,692 A | | 12/1991 | Grennan et al. |
| 5,101,656 A | | 4/1992 | Miller |
| 5,151,022 A | * | 9/1992 | Emerson et al. .......... 423/245.3 |
| 5,174,866 A | * | 12/1992 | Chen et al. ................. 205/634 |
| 5,224,550 A | | 7/1993 | Bragg |
| 5,359,522 A | | 10/1994 | Ryan |
| 5,425,886 A | | 6/1995 | Smith |
| 5,447,555 A | * | 9/1995 | Ye et al. ......................... 95/54 |
| 5,516,359 A | * | 5/1996 | Kang et al. .................... 95/14 |
| 5,562,754 A | * | 10/1996 | Kang et al. .................... 95/54 |
| 5,565,017 A | * | 10/1996 | Kang et al. .................... 95/14 |
| 5,584,194 A | * | 12/1996 | Gardner ....................... 62/615 |
| 5,611,841 A | | 3/1997 | Baker et al. |
| 5,746,397 A | | 5/1998 | DeField et al. |
| 5,788,184 A | | 8/1998 | Eddy |
| 5,837,125 A | * | 11/1998 | Prasad et al. ............... 205/763 |
| 5,904,190 A | | 5/1999 | Patel |
| 5,934,618 A | | 8/1999 | Kari et al. |
| 5,976,223 A | * | 11/1999 | Prasad et al. .................. 95/54 |
| 5,979,481 A | | 11/1999 | Ayresman |
| 6,012,533 A | | 1/2000 | Cramer |
| 6,136,267 A | | 10/2000 | Bergman |
| 6,182,714 B1 | | 2/2001 | Ginsburgh et al. |
| 6,293,084 B1 | * | 9/2001 | Drnevich et al. ............. 60/783 |
| 6,428,606 B1 | * | 8/2002 | Gottschlich et al. ........... 95/50 |
| 6,519,969 B2 | | 2/2003 | Sauterleute |
| 6,562,105 B2 | * | 5/2003 | Gottzmann .................... 95/54 |
| 6,623,714 B2 | * | 9/2003 | Shreiber et al. ............. 423/219 |
| 2002/0025507 A1 | | 2/2002 | Leigh et al. |

FOREIGN PATENT DOCUMENTS

| | | |
|---|---|---|
| WO | WO 98/57850 | 12/1998 |
| WO | WO 99/34106 | 7/1999 |
| WO | WO 00/00389 | 1/2000 |

* cited by examiner

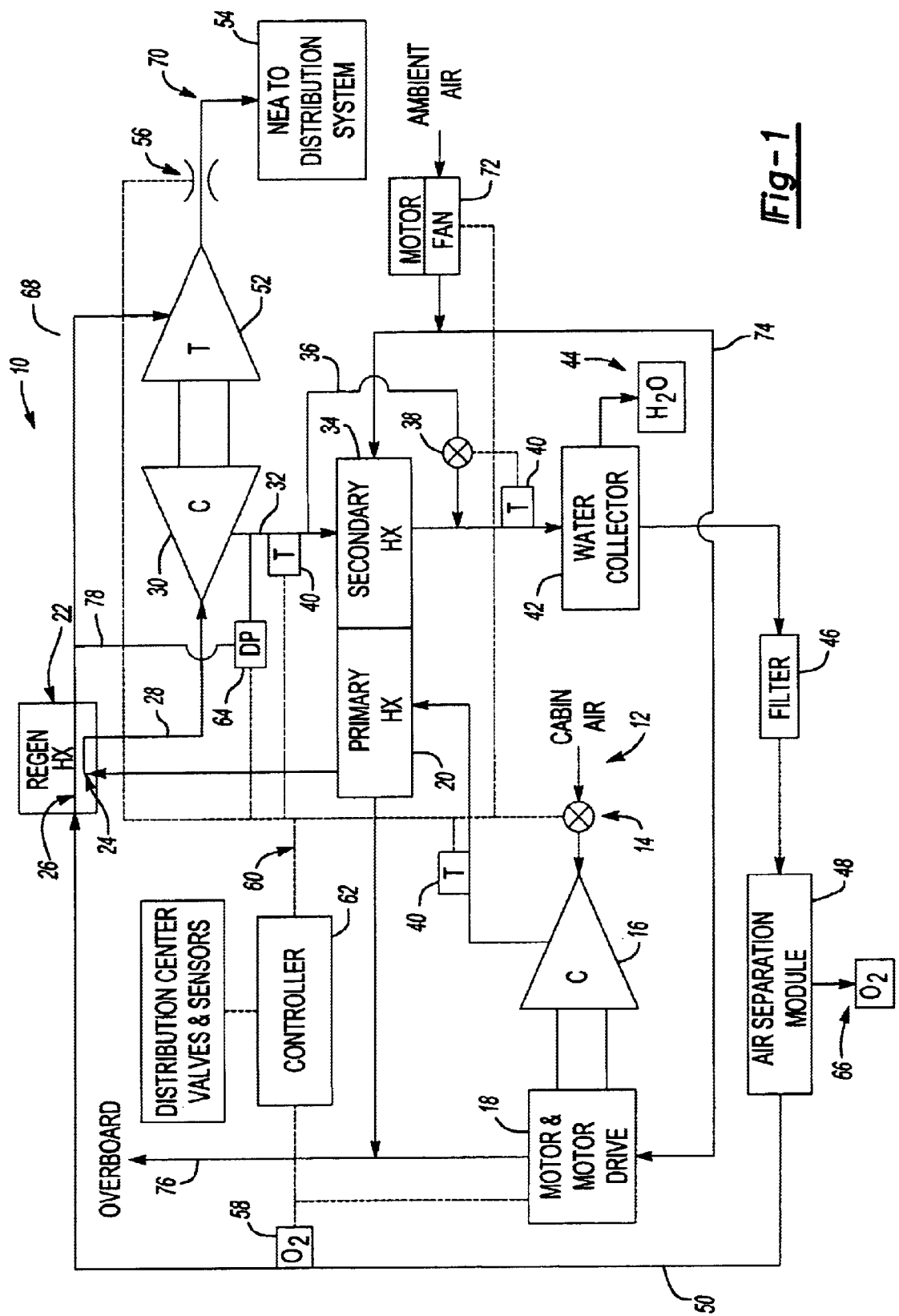

LOW POWER NITROGEN ENRICHED AIR GENERATION SYSTEM

BACKGROUND OF THE INVENTION

The present invention generally relates to a method and system for inerting aircraft fuel tanks by providing a nitrogen enriched air supply, and specifically to a system for increasing working air pressures to optimize efficiency of an air separation module by using exhaust gases to power a second compressor.

It is recognized that fuel vapors created within fuel tanks become combustible in the presence of oxygen. The possibility of explosion or fire can be substantially reduced by reducing or eliminating the amount of oxygen present within the fuel tank. It is known in the art to equip aircraft with onboard inert gas generating systems. The inert gas generating system supplies nitrogen enriched air to the vapor space within the fuel tank. The nitrogen-enriched air has a substantially reduced oxygen content that reduces or eliminates combustible conditions within the fuel tank.

Typically, the inert gas generating system includes a compressor powered by a motor that draws in air at a first pressure and exhausts air at a second pressure. The second pressure being much higher than the first pressure in order to obtain an optimal working pressure required for an air separation module. It is understood by workers in the art that air separation modules operate most efficiently at elevated pressures above pressure typically available from other on board systems. Therefore, a compressor elevates the pressure of air to the air separation module. The compressor and motor to drive the compressor contribute a substantial amount of weight to an aircraft. Weight and space on an aircraft are at a premium and any reduction or increase has a substantial effect on aircraft operation.

Accordingly, it is desirable to develop an inerting system for producing inert gas on board an aircraft that obtain optimal working pressures for air separation modules while reducing overall system weight and size.

SUMMARY OF THE INVENTION

An embodiment of this invention is an inerting system for reducing the oxygen content within an air stream including a second compressor driven by exhaust to increase air pressure to optimal working pressure of an air separation module.

The inerting system of this invention includes a first compressor elevating cabin air to a second pressure. The second pressure is at an intermediate level below an optimal air pressure level for an air separation module. Air exhausted from the first compressor is routed to a second compressor. The second compressor is driven by a turbine powered by oxygen depleted air exiting to the fuel distribution system. The second compressor elevates air pressure from the intermediate pressure exiting the first compressor to the optimal working pressure level for the air separation module.

The first compressor is only used to raise air pressure to an intermediate pressure and therefore the compressor and motor driving the compressor is smaller and lighter than a single compressor configured to elevate air pressure to the optimal working pressures for the air separation module.

Air exhausting from the second compressor is at the optimal working pressure for the air separation module. Air enters the air separation module and oxygen is substantially reduced or eliminated from the air stream. Air exiting the air separation module is then routed to the turbine that drives the second compressor. The pressure of air exiting the air separation module and driving the turbine is at a pressure much higher than that required by the fuel distribution system. Therefore, the excess energy available within the high-pressure air is used to drive the second compressor. Driving the second compressor with the energy provided in the high-pressure air utilizes energy that would otherwise simply be exhausted to atmosphere to allow a substantial reduction in capacity and weight of the first compressor that in turn provides an overall weight and size reduction of the inerting system.

Accordingly, the inerting system of this invention provides a compact and lightweight system by utilizing excess energy input into the system to drive a second compressor to optimize oxygen reduction in gases used to inert fuel tanks.

BRIEF DESCRIPTION OF THE DRAWINGS

The various features and advantages of this invention will become apparent to those skilled in the art from the following detailed description of the currently preferred embodiment. FIG. 1 that accompanies the detailed description can be briefly described as a schematic view of the inerting system of this invention.

DETAILED DESCRIPTION OF THE PREFERRED EMBODIMENT

Referring to FIG. 1, an embodiment of this invention is an inerting system generally indicated at 10. The inerting system 10 includes an air separation module 48 to remove oxygen from air drawn from the cabin of the aircraft as indicated at 12. The air separation module 48 operates most efficiently to remove oxygen from air at an optimal working pressure. To obtain the optimal working pressure a first compressor 16 is provided. The first compressor 16 provided is driven by a motor 18. The motor 18 and compressor 16 are of a size and capacity to only elevate air pressure a portion of the required working pressure.

A second compressor 30 powered by a turbine 52 used air pressure exiting the inerting system through the outlet 70. Air exiting the outlet 70 to the fuel distribution system 54 is only required to be at a pressure matching that of the conditions within the fuel distribution system. The pressure required within the fuel distribution system 54 is much lower than the required working pressure of the air separation module 48. The difference between the pressure required in the fuel distribution system 54 and the working pressure required by the air separation module 48 is used to power the second compressor 30.

The inerting system 10 includes a first compressor 16 to elevate air pressure to an intermediate level, lower than the working pressure of the air separation module 48. The difference in pressure between the working pressure of the air separation module 48 and that required by the fuel distribution system 54 would normally be corrected by venting excess pressure to atmosphere by way of a control valve. This invention uses the excess energy normally lost to drive a turbine and power the second compressor 30. The second compressor 30 provides the additional power required to increase air pressure from the intermediate pressure exhausted from the first compressor 16 to the working pressure required to optimally operate the air separation module 48.

In operation, the inerting system 10 draws cabin air 12 through a cabin air valve 14. As appreciated, although preferably cabin air is drawn into the first compressor 16, other sources of air that are available to an aircraft such as air exhausting from the engine or air present outside of the aircraft could also be used and routed to the first compressor 16. Cabin air 12 is at a first pressure much lower than the working pressure required to optimally operate the air separation module 48. As appreciated the interior cabin of an aircraft is typically pressurized to simulate an altitude of approximately 8,000 feet. The first compressor 16 exhausts air at a second pressure, greater than the first pressure present within the cabin.

Exhaust air from the first compressor 16 flows through a primary heat exchanger 20. The primary heat exchanger 20 reduces air temperature to a desired temperature that provides favorable conditions for separation of oxygen. In the preferred embodiment, the primary heat exchanger 20 exchanges heat with ambient air that is supplied by an ambient air fan 72 driving air through an ambient air circuit 74. The ambient air circuit 74 dumps heated air overboard as indicated at 76. Preferably, ambient air is used as a cooling medium to cool air exhausting from the first compressor 16, however other cooling means and heat exchangers as are known to a worker skilled in the art would be within the contemplation of this invention and fall within the scope of this invention.

Air exiting the primary heat exchanger 20 enters a regenerative heat exchanger 22. The regenerated heat exchanger 22 includes a first circuit 24 and a second circuit 26. The first circuit 24 channels air from the primary heat exchanger 20 to the second compressor 30. The first circuit 24 and second circuit 26 are in thermal contact. Air in the second circuit 26 acts as a cooling medium for air within the first circuit 24. Air exhausting from the regenerative heat exchanger 22 exits through outlet 28 to the second compressor 30.

The second compressor 30 is driven by a turbine 52. The turbine 52 is in turn driven by air at the third pressure or working pressure in circuit 68. Air entering the second compressor 30 is at a second pressure common with air exiting the first compressor 16. Air exiting the second compressor 30 exits at a third pressure within the circuit indicated at 32. The third pressure is greater than the second pressure and is at the working pressure that is of an optimal level for removing oxygen from the air within the air separation module 48. The third pressure is of a pressure that would not be attainable by the compressor 16. The compressor 16 is of a much smaller and lightweight configuration having a smaller capacity because it is not required to raise the level of pressure to that of the working pressure required by the air separation module 48. The second compressor 30 driven by the turbine 52 provides the additional work and energy required to elevate air to the working pressure of the air separation module 48.

Air exiting the second compressor 30 through the circuit 32 either enters a secondary heat exchanger 34 or proceeds through a bypass circuit 36. A temperature sensor 40 measures the temperature of the air and transmits this temperature of air within the circuit 32 to a controller 62. The temperature sensor 40 is attached to the controller 62 by way of the electric circuit indicated at 60. The controller 62 signals the opening of a control valve 38 in response to a predetermined temperature sensed by the temperature sensor 40. As appreciated, if the air temperature exiting the second compressor 30 is of an elevated temperature, that air would be routed through the secondary heat exchanger 34. Otherwise the bypass valve 38 will be opened and allow air to bypass around the secondary heat exchanger and travel directly into a water collector 42.

Air exiting the bypass circuit 36 or the secondary heat exchanger 34 enters the water collector 42. The water collector 42 may be of any configuration or type as known to a worker skilled in the art. Excess water is removed from the airstream at this point and dumped to an $H_2O$ container or simply dumped overboard each of which is indicated at 44.

Air exiting the water collector 42 enters a filter 46. The filter 46 removes contaminants and particulates that may have accumulated in the air supply. After filtering air enters the air separation module 48. The air separation module 48 may be of any type or configuration as is known to a worker skilled in the art. The specific type of air separation module is application dependent and it is within the contemplation of this invention that any type of air separation module as is known to a worker skilled in the art may be used and is compatible with this invention. The air separation module 48 removes oxygen to a separate oxygen circuit or storage tank 66. As appreciated, the oxygen removed from the air indicated at 66 may be used in other systems of the aircraft vehicle or may simply be dumped overboard depending on application requirements. Air exiting the air separation module 48 is at a third pressure. This third pressure has been elevated by the second compressor 30 and is indicated within the circuit 50. An oxygen sensor 58 is disposed within this circuit to measure and transmit oxygen content information to the controller 62.

Air exiting the air separation module 48 travels through the regenerative heat exchanger 22 through the second circuit 26. This air is at a third temperature within the circuit 68 that is at a much higher level than is required by the fuel distribution system 54. The circuit 68 between the regenerative heat exchanger and a turbine 52 includes air at this third pressure. Air enters the turbine 52 and drives the second compressor 30. Air pressure drops between the inlet of the turbine 52 and the exit through the flow measurement device 56. The drop in pressure releases a substantial amount of energy that is reclaimed to drive the second compressor 30.

Air exiting the turbine 52 flows through the flow measurement device 56. The flow measurement device 56 may be of any type or configuration known to a worker skilled in the art. The flow measurement device 56 monitors air pressure exiting the inerting system 10. The flow measurement device 56 regulates the amount of oxygen-depleted air that is routed to the fuel distribution system 54. The system 10 also includes a circuit 78 pressure sensor 64 for monitoring a pressure difference between air exiting the second compressor 30 and air entering the turbine 52.

The inerting system 10 of this invention is of a compact configuration and of a much lighter weight than conventionally configured inerting systems because the first compressor 16 is of a reduced size and weight. The reduced size and weight of the first compressor 16 is possible only by the use of the second compressor 30. The second compressor 30 is driven by a turbine 52. The turbine 52 is in turn driven by air exiting to the fuel distribution system from the inerting system 10. The drop in pressure between the inerting system and the fuel distribution system 54 releases a substantial amount of energy that is reclaimed by the turbine 52 and used to elevate the pressures within the inerting system 10, such that air pressure through the air separation module 48 is of an optimum pressure to release and separate oxygen 66.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of removing oxygen from air within a fuel distribution system comprising the steps of:
   a. compressing air from a first pressure to a second pressure higher than the first pressure with a first compressor;
   b. compressing air at said second pressure to a third pressure higher than said second pressure with a second compressor;
   c. removing oxygen from said air with an air separation module;
   d. driving said second compressor with energy recovered from said air at said third pressure by a turbine receiving air at said third pressure at an inlet and exhausting air at a fourth pressure lower than said third pressure to the fuel distribution system.

2. The method of claim 1, further including the step of cooling air exhausted from said first compressor with a heat exchanger.

3. The method of claim 1, including the step of filtering contaminants from said air before removing oxygen.

4. The method of claim 1, wherein said third pressure is a pressure greater than a pressure capacity of said first compressor.

5. The method of claim 1, wherein said third pressure is an optimum working pressure for said air separation module.

6. An inerting system for a fuel distribution system for reducing combustibility by reducing air oxygen content comprising:

a first compressor drawing in air at a first pressure and exhausting air at a second pressure greater than said first pressure, a second compressor driven by a turbine drawing air from said first compressor at said second pressure and exhausting air at a third pressure greater than said second pressure; and an air separation module for removing oxygen from said air, said air separation module receiving air at said third pressure from said second compressor;

said turbine including an inlet and an outlet, said inlet receiving air at said third pressure and said outlet exhausting oxygen depleted air at a fourth pressure lower than said third pressure to the fuel distribution system.

7. The system of claim 6, including a motor for driving said first compressor.

8. The system of claim 6, including a first heat exchanger for cooling air exhausted from said first compressor.

9. The system of claim 6, including a second heat exchanger for cooling air exhausted from said second compressor.

10. The system of claim 6, including a water collection device for removing water from air exhausted from said second compressor.

11. The system of claim 6, including a filter for collecting contaminates in said air before entering said air separation module.

12. The system of claim 6, including a third heat exchanger for heating air before entering said turbine.

13. The system of claim 6, wherein the fuel distribution system is a fuel tank, said system replacing air within said fuel tank with oxygen depleted air to reduce combustibility.

14. The system of claim 6, wherein said turbine is powered by air at said third pressure to drive said second compressor increasing the pressure of air entering said air separation module to optimize oxygen removal.

15. The system of claim 6, including a controller, and an electrically actuated control valve for controlling air flow.

16. The system of claim 15, including a bypass circuit for bypassing air around said second heat exchanger in response to a temperature of said air being within a predetermined range.

17. The system of claim 15, including an oxygen sensor in communication with said controller for monitoring oxygen content exiting said air separation module.

18. The system of claim 15, including a flow measurement device for measuring airflow exhausted from said turbine to said fuel distribution system.

* * * * *